Patented Jan. 23, 1934

1,944,825

UNITED STATES PATENT OFFICE 1,944,825

ELECTRIC INCANDESCENT LAMP

Theodore Millner, Ujpest, by Budapest, Hungary, assignor, by mesne assignments, to General Electric Company, a corporation of New York No Drawing. Application December 21, 1929, Serial No. 415,876, and in Hungary December 18, 1928

3 Claims. (Cl. 176—16)

The present invention relates to electric incandescent lamps, particularly to gas-filled and vacuum lamps fitted with filaments made of metals having a high melting-point, for instance of tungsten. It is a well-known fact that the internal surface of the bulbs of such lamps becomes coated, during burning, with a precipitate of in most cases dark color. The formation of this precipitate, the so-called blackening of the lamp, is mostly due to two causes: partly to the action exerted on the filament by chemically active residue gases, as water vapor, carbon dioxide, etc., and partly to evaporation of the material of the filament. All blackening of the lamp bulb has detrimental effects, inasmuch as it absorbs a part of the light emitted by the lamp. Processes caused by residue gases are particularly harmful as in addition to causing blackening of the lamp bulb, they also consume the material of the filament over and above the consumption due to evaporation and thus considerably reduce the life of the lamp as well.

A number of methods are known for diminishing the blackening of the lamp bulb, and for eliminating the effects of residue gases, in the first place those of water vapor, the desired effect being realized in these methods by means of certain substances called getter substances, introduced into the lamp. In the case of one group of known getter substances phosphoric oxide or phosphorous pentoxide $P_2O_5$, barium monoxide or baryta $BaO$, or of the decomposition products of these substances formed during the burning of the lamp, it is to their water-absorbing properties in the first place that their effect of reducing the blackening of the lamp bulb is due.

Experience teaches that the residue gas most difficult to eliminate from the lamp is water vapor, since it is possible that, although the preparatory manufacture of the lamp has been carried out in the most careful way, a small but nevertheless harmful quantity of water vapor may permanently be liberated during a considerable length of time from the parts of the lamp, particularly from its glass parts. Now, small traces of water-vapor are already sufficient to transform a part of the hot filament, e. g. of the tungsten filament into a volatile precipitate which is precipitated on the lamp bulb as a black-colored deposit. During the blackening effect, caused by the water vapor hydrogen is liberated from the same which in contact with the hot tungsten filament is partly transformed into atomic hydrogen. Atomic hydrogen, at the temperatures ruling in the burning lamp, will easily reduce certain easily reductible oxides, as for instance: the oxide of lead contained in the parts made of lead glass; contaminations, consisting of oxides, contained in the metal parts; tungsten oxides formed by the action of the water vapor, etc. Water vapor is reconstituted by the reduction, and this water vapor will subsequently again exert its action on the tungsten filament, causing blackening of the bulb, such action being of course destructive to the tungsten filament. It will therefore be understood that getter substances possessing water-absorbing properties are very suitable for stopping this constantly repeated detrimental process.

The substances which have been used up to now as getter substances possessing water-absorbing properties were without exception chemical compounds the boiling-point of which is as a rule considerably higher than 1000° C. but in all cases exceeds 400° C. I have found that a much more radical anti-blackening effect can be realized if instead of the getter substances defined above, volatile or gaseous water-absorbing substances are introduced into the lamp, particularly substances which are gaseous at ordinary room temperature. Substances which, according to this invention, may advantageously be employed are, for instance, volatile or gaseous halogen compounds possessing water-absorbing properties, particularly fluorides, but most particularly gaseous silicon fluoride or tetrafluoride ($SiF_4$), which substance may either be employed alone, or together with other getter substances covered by the present invention, or together with getter substances already known. Besides silicon tetra-fluoride, other water-absorbing substances of the halogen group possessing the properties referred to, as boron trifluoride ($BF_3$), arsenic tri- and penta-fluorides ($AsF_3$, $AsF_5$), phosphorous tri- and penta-fluorides $PF_3$, can also be employed with very good results.

According to the invention the getter substances possessing the properties referred to may be employed with good results for diminishing or respectively stopping the blackening of the lamp bulbs in vacuum lamps as well as in gas-filled lamps.

In the case of gas-filled lamps, the advantageous effect of the getter substances in question may probably be explained by the fact that owing to the permanent flow of gas set up in gas-filled lamps during burning it is possible for the volatile or gaseous water-absorbing getter to be present permanently at every point in the whole lamp in effective concentration, which cannot happen to any substantial extent if non-volatile or less volatile water-absorbing getter substances are employed. In the case of vacuum lamps, on the other hand, their advantageous effect may probably be explained by the fact, that the volatile or gaseous water-absorbing subsance, which is preferably introduced into the vacuum lamp at a small pressure, is uniformly fixed on the whole internal surface of the lamp by the process of electric gas fixing, the so-called "clean-up" process, taking place when these lamps are first put under current, the capacity of such surface for giving off water being vigorously stopped by these means.

It will be understood that in the case of employing non-volatile or less volatile getter substances it is a much more uncertain affair to produce a "clean-up" process similarly effective as regards water-absorption.

There are various methods for effectively employing the getter substances in question. A few of these methods are mentioned in what follows by way of example.

An advantageous method for introducing getter substances possessing the properties referred to into the lamp consists, for instance, in rinsing the lamp bulb, in the course of its usual treatment, with one or more volatile or gaseous getter substances possessing the properties referred to, or with some rinsing gas containing such getter substances. This method is particularly suitable for introducing getter substances possessing the properties referred to into vacuum lamps, the desired quantity of getter remaining, in the case of these lamps, in the lamp, as a residue gas, after the evacuation of the lamp, and exerting its action there.

In the case of gas-filled lamps the desired quantity of getter substances possessing the properties referred to may for instance be introduced into the lamp mixed with the gas used for filling, either by effecting the mixture of the gas used for filling with the volatile or gaseous getter substance in the lamp itself, or by introducing into the lamp filling gas which has already previously been mixed with the volatile or gaseous getter substance.

It has been found by experience that it is particularly advantageous to produce or generate the volatile or gaseous substances possessing the water-absorbing properties referred to in the completed lamp itself, for instance by introducing into the lamp during its preparatory process of manufacture, a less volatile substance or a number of less volatile substances more easy to handle than moisture absorbing gases, from which less volatile substances it is possible to produce in the lamp, preferably after its having been sealed, the desired, for instance gaseous, substances referred to possessing getter effects, by the mutual action on each other or by the decomposition of the substances introduced, such mutual action or decomposition being brought about by means of some subsequent treatment, for instance by means of heating.

Thus, among others there may be employed with the desired effect all reaction mixtures, which under the influence of some subsequent treatment, for instance under the action of heat, are capable of producing volatile, or gaseous moisture-absorbing getter substances. Such a reaction mixture is, for instance, afforded by a mixture of fluorspar ($CaF_2$) and arsenic trioxide ($As_2O_3$), from which for instance by the heating effect of the incandescent filament of the burning lamp, volatile arsenic fluoride or trifluoride $AsF_3$ may easily be produced.

It is, besides, according to the present invention possible to use in a most effective manner, as a getter substance for diminishing or stopping the blackening of the bulbs, compound substances, like double or complex salts, one or more constituents of which are formed by the volatile or gaseous compounds possessing the water-absorbing properties referred to, particularly if the compound substance is solid, and the volatile or gaseous substance in question is at least partly, liberated from it by heating. Such compounds are for instance the salts of hydro flusilicic acid ($H_2SiF_6$), particularly by aid of its earth-alcali metal and alcali metal salts, and most particularly by aid of the potassium normal salt the constitution of which is represented by the formula $K_2SiF_6$, (potassium silico-fluoride) which when heated partly decomposes into silicon tetrafluorine ($SiF_4$), possessing water-absorbing properties, and into potassium fluoride ($KF$).

The particularly effective action of the salts of $H_2SiF_6$ with regard to diminishing or respectively stopping the blackening of the bulbs is most probably due, in addition to the powerful action of their products of decomposition on the residue gases, and particularly on water vapor, also to another property different from that referred to above possessed by these products, notably to their getter effect of discolouring the precipitate.

In order to elucidate this effect we would mention the following particulars. Getter substances as $NaCl$, $CaF_2$, $Na_3AlF_6$ etc. have been known for some time, which do not possess marked water-absorbing properties and therefore do not, in the first place diminish the blackening caused by the water vapor in the lamp, but which reaching the inner surface of the lamp bulb fix the tungsten-containing precipitate evaporated from the tungsten filament and precipitated on the lamp bulb, in such a form as to cause the lamp bulb, in consequence hereof, to absorb a smaller proportion of the light emitted by the burning lamp than would be absorbed by the same lamp bulb under similar conditions if it had not been originally provided with this getter.

Experience teaches that the salts particularly the potassium and sodium salts of $H_2SiF_6$ etc. or respectively partly the products of decomposition of these salts, exert, beside their water absorbing effect, a very powerful discoloring effect as well, this being expressed among others by the fact that they not only reduce the rate at which the dark precipitate is formed, but also destroy the metallic black color of the blackening produced by the natural evaporation of the incandescent filament, changing it to a transparent light brown hue.

I have found that in the case of vacuum as well as in that of gas-filled lamps, the salts of $H_2SiF_6$ and particularly the potassium silicofluoride or fluo-monosilicate, the constitution of which is represented by the formula ($K_2SiF_6$) and the corresponding sodium salt ($Na_2SiF_6$) can be employed with particularly good results for diminishing or respectively stopping the blackening of the bulbs whether due to residue gases or to evaporation, in vacuum lamps as well as in gas-filled lamps.

The solid getter substances according to the invention may be introduced into the lamp bulb or respectively conveyed to its surface by any of the known methods. Thus for instance by spraying their alcoholic suspension on the filament before sealing the lamp, and after the subsequent sealing of the lamp, heating the filament and thus evaporating and/or decomposing the solid getters.

What I claim is:

1. An electric incandescent lamp containing a fluoride of an element having an atomic weight higher than 11, said fluoride being gaseous at room temperature.

2. An electric incandescent lamp containing a silicon fluorine compound which is volatile at room temperature.

3. An electric incandescent lamp containing a phosphorous fluorine compound which is volatile at room temperature.

THEODORE MILLNER.